(12) United States Patent
Koike et al.

(10) Patent No.: US 6,590,316 B2
(45) Date of Patent: Jul. 8, 2003

(54) VIBRATOR, VIBRATING GYROSCOPE, AND ELECTRONIC APPARATUS USING THE VIBRATING GYROSCOPE

(75) Inventors: Masato Koike, Nakaniikawa-gun (JP); Katsumi Fujimoto, Kaminiikawa-gun (JP); Nobuyuki Ishitoko, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/027,181

(22) Filed: Dec. 26, 2001

(65) Prior Publication Data

US 2002/0089260 A1 Jul. 11, 2002

(30) Foreign Application Priority Data

Jan. 10, 2001 (JP) .......................................... 2001-002473
Nov. 7, 2001 (JP) .......................................... 2001-341987

(51) Int. Cl.$^7$ .............................................. H01L 41/08
(52) U.S. Cl. ........................ 310/358; 310/366; 310/368
(58) Field of Search ................................ 310/358, 359, 310/320, 366, 368

(56) References Cited

U.S. PATENT DOCUMENTS

| | | | | |
|---|---|---|---|---|
| 4,503,350 A | * | 3/1985 | Nakatani | 310/321 |
| 4,570,098 A | * | 2/1986 | Tomita et al. | 310/346 |
| 5,300,852 A | * | 4/1994 | Isogai et al. | 310/358 |
| 5,461,274 A | * | 10/1995 | Yuji et al. | 310/330 |
| 5,635,786 A | * | 6/1997 | Fujimoto et al. | 310/366 X |
| 5,765,046 A | * | 6/1998 | Watanabe et al. | 396/53 |
| 6,288,478 B1 | * | 9/2001 | Ishitoko et al. | 310/366 X |

FOREIGN PATENT DOCUMENTS

JP 07-332988 12/1995

* cited by examiner

*Primary Examiner*—Mark O. Budd
(74) *Attorney, Agent, or Firm*—Keating & Bennett, LLP

(57) ABSTRACT

The present invention provides a piezoelectric vibrator, in which there is no significant change in the characteristics even when depole occurs due to heat shock and the like. The piezoelectric vibrator includes a first piezoelectric substrate having split electrodes formed on one main surface thereof and a second piezoelectric substrate having a common electrode formed on one main surface thereof. The remaining main surfaces of both piezoelectric substrates are bonded to each other via an intermediate electrode. The material of the first piezoelectric substrate differs from the material of the second piezoelectric substrate. As a result, the difference (longitudinal DF) between a resonant frequency and an anti-resonant frequency in a longitudinal vibration of the piezoelectric vibrator substantially coincides with the difference (transverse DF) between a resonant frequency and an anti-resonant frequency in a transverse vibration thereof.

5 Claims, 3 Drawing Sheets

○: LONGITUDINAL DF
□: TRANSVERSE DF

COMBINATION OF MATERIALS

VIBRATOR, VIBRATING GYROSCOPE, AND ELECTRONIC APPARATUS USING THE VIBRATING GYROSCOPE

BACKGROUND OF THE INVENTION

1. Field of the Invention

The present invention relates to vibrators, vibrating gyroscopes using the vibrators, and electronic apparatuses using the gyroscope.

2. Description of the Related Art

Japanese Unexamined Patent Application Publication No. 7-332988 describes a piezoelectric vibrator and a vibrating gyroscope using the piezoelectric vibrator. In this piezoelectric vibrator, a first piezoelectric substrate is polarized in the thickness direction and split electrodes are formed on one of the main surfaces of the first piezoelectric substrate. A second piezoelectric substrate is also polarized in the thickness direction and a common electrode is formed on one of the main surfaces of the second piezoelectric substrate. In addition, the remaining main surfaces of the first and second piezoelectric substrates are bonded to each other to constitute the piezoelectric vibrator.

The above piezoelectric vibrator has a resonant frequency and an anti-resonant frequency in each of a longitudinal vibration as a bending vibration in the thickness direction and a transverse vibration as a bending vibration in the widthwise direction. In this case, the thicknesswise direction and the widthwise direction of the piezoelectric vibrator are equivalent to the thicknesswise direction and the widthwise direction of each of the first and second piezoelectric substrates.

In the present invention, the difference between a resonant frequency and an anti-resonant frequency obtained in a longitudinal vibration of a piezoelectric vibrator is defined as a longitudinal DF, and the difference between a resonant frequency and an anti-resonant frequency obtained in a transverse vibration thereof is defined as a transverse DF.

In the related art, the material of the first piezoelectric substrate is the same as the material of the second piezoelectric substrate. In this case, in terms of the relationship between the longitudinal DF and the transverse DF in the piezoelectric vibrator, the longitudinal DF is found to be approximately twice as large as the transverse DF.

In such a piezoelectric vibrator, when depole occurs in the piezoelectric substrate even slightly due to heat shock or the like, the longitudinal DF and the transverse DF change at the same rate. When the longitudinal DF differs from the transverse DF significantly, the amounts of the changes of them are also significantly different. Thus, since the amount of change in the resonant frequency of the longitudinal vibration differs from the amount of change in the resonant frequency of the transverse vibration, the difference between the resonant frequencies of the longitudinal and transverse vibrations changes. As a result, the characteristics of the piezoelectric vibrator also change.

SUMMARY OF THE INVENTION

Accordingly, it is an object of the present invention to provide a piezoelectric vibrator whose characteristics do not change significantly even when depole occurs due to heat shock or the like. It is another object of the invention to provide a vibrating gyroscope using the piezoelectric vibrator and an electronic apparatus using the vibrating gyroscope.

According to a first aspect of the present invention, there is provided a piezoelectric vibrator including a first piezoelectric substrate polarized in the thickness direction, split electrodes formed on one of the main surfaces of the first piezoelectric substrate, a second piezoelectric substrate polarized in the thickness direction, and a common electrode formed on one of the main surfaces of the second piezoelectric substrate. The remaining main surface of the first piezoelectric substrate is bonded to the remaining main surface of the second piezoelectric substrate and the material of the first piezoelectric substrate is different from the material of the second piezoelectric substrate.

In this piezoelectric vibrator, the material of the first piezoelectric substrate is set as a first material and the material of the second piezoelectric substrate is set as a second material. The first and the second materials may be chosen such that a first difference between a resonant frequency and an anti-resonant frequency obtained in a longitudinal vibration of the piezoelectric vibrator in which the first and second piezoelectric substrates are made of only the first material is greater than a second difference between a resonant frequency and an anti-resonant frequency obtained in a longitudinal vibration of the piezoelectric vibrator in which the first and second piezoelectric substrates are made of only the second material.

In addition, the first and second materials may be chosen such that the average value of the first and second differences substantially coincides with the value of the difference between a resonant frequency and an anti-resonant frequency obtained in a transverse vibration of the piezoelectric vibrator in which the first and second piezoelectric substrates are made of the first material.

According to a second aspect of the invention, there is provided a vibrating gyroscope including the piezoelectric vibrator of the invention, a driving unit for longitudinally vibrating the piezoelectric vibrator, and a detecting unit for detecting the transverse vibration of the piezoelectric vibrator.

According to a third aspect of the invention, there is provided an electronic apparatus including the vibrating gyroscope.

With the above-described arrangement, in the piezoelectric vibrator of the invention, even when depole occurs due to heat shock or the like, there is no significant change in the characteristics.

In addition, in the vibrating gyroscope and the electronic apparatus according to the present invention, the characteristics do not change significantly due to a change in environment.

DESCRIPTION OF THE PREFERRED EMBODIMENTS

Figure 1:
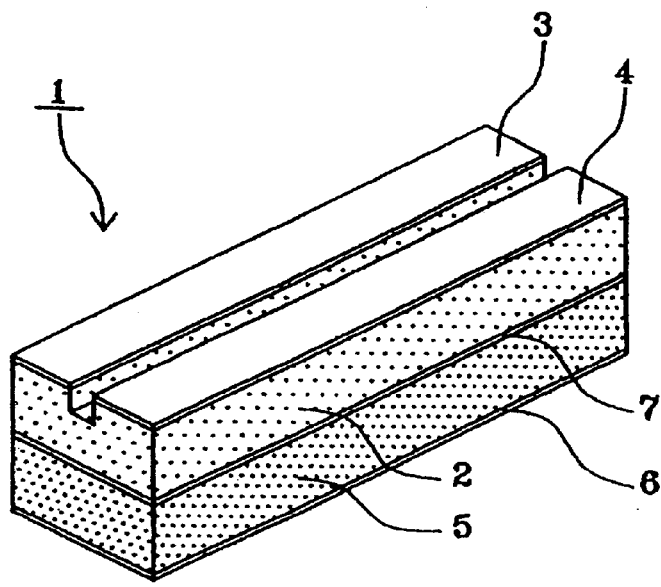
FIG. 1 is a perspective view of a piezoelectric vibrator according to an embodiment of the present invention.

FIG. 1 shows a perspective view of a piezoelectric vibrator according to an embodiment of the invention. In FIG. 1, a piezoelectric vibrator 1 includes a first piezoelectric substrate 2 having split electrodes 3 and 4 formed on one main surface thereof, a second piezoelectric substrate 5 having a common electrode 6 formed on one main surface thereof, and the remaining main surfaces of the first and second piezoelectric substrates are bonded to each other via an intermediate electrode 7. Each of the first and second piezoelectric substrates 2, 5 has a width of 1.0 mm, a length of 13 mm, a thickness of 0.5 mm. The first piezoelectric substrate 2 is made of a first material A and the second piezoelectric substrate 5 is made of a second material B. The first material A has a piezoelectric constant (d31) regarding a bending vibration of −101 pC/N, and the second material B has a piezoelectric constant (d31) regarding a bending vibration of −59.3 pC/N.

Figure 2:
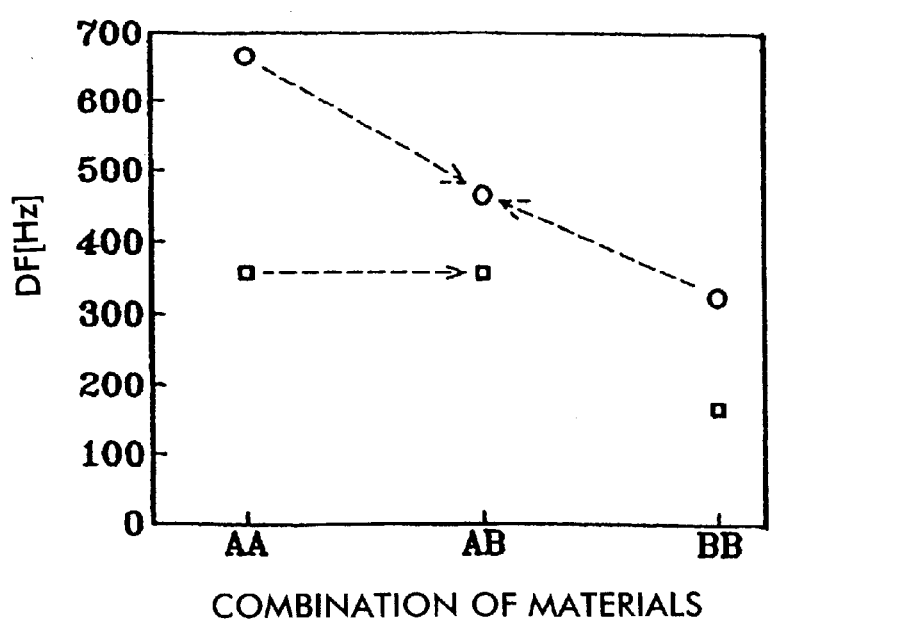
FIG. 2 is a graph showing the relationships between the combinations of the materials of first and second piezoelectric substrates and a longitudinal DF and a transverse DF.

As shown in FIG. 2 when the first and second piezoelectric substrates 2 and 5 are both made of the material A and have the same shape, the longitudinal DF (longitudinal DFa) of the piezoelectric vibrator is 665 Hz and the transverse DF (transverse DFa) thereof is 365 Hz. In this case, the ratio between the longitudinal DFa and the transverse DFa stands at 1.82, that is, the longitudinal DFa is found to be approximately twice as large as the transverse DFa. Also as shown in FIG. 2, when the first and second piezoelectric substrates 2 and 5 are both made of the material B and have the same shape, the longitudinal DF (longitudinal DFb) of the piezoelectric vibrator is 325 Hz and the transverse DF (transverse DFb) thereof is 172 Hz. The ratio between both of them stands at 1.89, that is, the longitudinal DFb is found to be approximately twice as large as the transverse DFb.

In a piezoelectric vibrator of this configuration in which the first piezoelectric substrate is made of the first material and the second piezoelectric substrate is made of the second material, the longitudinal DF is approximately equal to the average between the longitudinal DF obtained when the first and second piezoelectric substrates are made of only the first material and the longitudinal DF obtained when they are made of only the second material. Accordingly, by choosing the first and second materials in such a manner that the longitudinal DF obtained when the first and second piezoelectric substrates are made of the first material is larger than the longitudinal DF obtained when the first and second piezoelectric substrates are made of the second material, the longitudinal DF of the piezoelectric vibrator having the first piezoelectric substrate made of the first material and the second piezoelectric substrate made of the second material can be made smaller than the longitudinal DF obtained when the first and second piezoelectric substrates are made of the first material.

On the other hand, in a piezoelectric vibrator of this configuration in which the first piezoelectric substrate is made of the first material and the second piezoelectric substrate is made of the second material, the transverse DF of the piezoelectric vibrator having the first piezoelectric substrate made of the first material and the second piezoelectric substrate made of the second material substantially coincides with the transverse DF obtained when the first and second piezoelectric substrates are made of the first material, and there is little influence given by the transverse DF obtained when the first and second piezoelectric substrates are made of the second material.

Accordingly, by choosing the first and second materials in such a manner that the longitudinal DF obtained when the first and second piezoelectric substrates are made of the first material is larger than the longitudinal DF obtained when the first and second piezoelectric substrates are made of the second material, the longitudinal DF of the piezoelectric vibrator having the first piezoelectric substrate made of the first material and the second piezoelectric substrate made of the second material can be set close to the transverse DF obtained when the first and second piezoelectric substrates are made of the first material.

Now, a consideration will be given to the case in which the first material is a material A and the second material is a material B.

The average value between the longitudinal DF (longitudinal DFa) obtained when the first and second piezoelectric substrates are made of the material A and the longitudinal DF (longitudinal DFb) obtained when the first and second piezoelectric substrates are made of the material B is (665+325)÷2=495 Hz. In addition, the transverse DF (transverse DFa) obtained when the first and second piezoelectric substrates are made of the material A is 365 Hz as shown above. The ratio between the average value and the transverse DF stands at substantially 1.35. When compared with the ratio of approximately 2.0 in the related art, both values are very close and are found to be substantially equal.

Actually, when the first piezoelectric substrate 2 is made of the material A and the second piezoelectric substrate 5 is made of the material B, the longitudinal DF (longitudinal DFab) of the piezoelectric vibrator 1 is 467 Hz and the transverse DF (transverse DFab) thereof is 356 Hz. Thus, this result substantially coincides with the above calculation, and when compared with the related art, both values are found to be close to each other.

FIG. 2 is a graph showing the above relationship. In FIG. 2, there are provided a transverse axis indicating the combinations of the materials of the first and second piezoelectric substrates and a longitudinal axis indicating the longitudinal DF and the transverse DF. In terms of the combinations of the materials, "AA" and "BB" indicate the case in which the first and second piezoelectric substrates are made of only the material A and the case in which the substrates are made of only the material B, respectively. Additionally, "AB" indicates the case in which the first piezoelectric substrate is made of the material A and the second piezoelectric substrate is made of the material B. As shown in FIG. 2, the value of the longitudinal DF obtained when the first and second piezoelectric substrates are made of the different materials is substantially equal to the average value between the longitudinal DF obtained when the first and second piezoelectric substrates are made of only the first material and the longitudinal DF obtained when they are made of only the second material. In this situation, the transverse DF is found to be substantially equal to the transverse DF obtained when the first and second piezoelectric substrates are made of the first material.

In contrast, when the first piezoelectric substrate is made of the material B and the second piezoelectric substrate is made of the material A, the difference between the longitudinal DF and the transverse DF increases. Thus, this case cannot be applied.

As explained above, with the first piezoelectric substrate 2 and the second piezoelectric substrate 5 made of the mutually different materials, the longitudinal DF and the transverse DF of the piezoelectric vibrator can substantially be made equal. As a result, even though depole occurs in the piezoelectric substrates due to heat shock or the like, the amount of change in the resonant frequency of the longitudinal vibration are approximately equal to the amount of change in the resonant frequency of the transverse vibration, and there is little change in the difference between the longitudinal DF and the transverse DF. Accordingly, there is an advantage in that the characteristics of the piezoelectric vibrator do not change significantly due to a change in environment.

In the above embodiment, the longitudinal DF is not the same as the transverse DF completely. However, as anticipated in FIG. 2, by choosing a material capable of making the longitudinal DF smaller as the material B, both DF can become the same completely.

As shown above, by using the first and second piezoelectric substrates made of the different materials, the longitudinal DF can be the same as the transverse DF. Furthermore, when the longitudinal DF does not necessarily have to be the same as the transverse DF, variations in the characteristics of the piezoelectric vibrator can be expanded more than variations in the kinds of the materials. Depending on the combinations of the materials, for example, a low-priced piezoelectric vibrator having good characteristics can be obtained.

Figure 3:
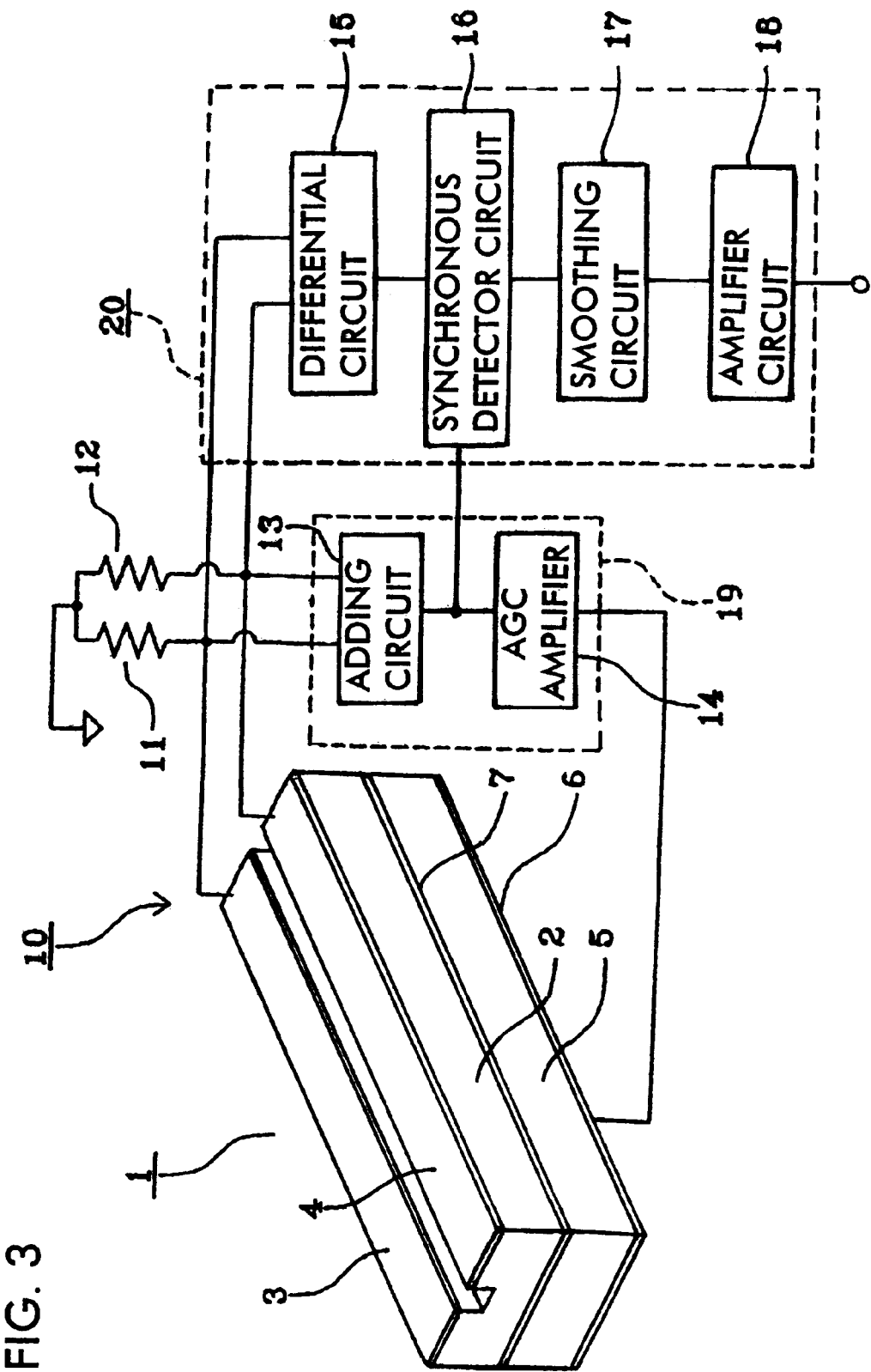
FIG. 3 is a schematic block diagram of a vibrating gyroscope according to another embodiment of the present invention.

FIG. 3 shows a schematic block diagram of a vibrating gyroscope according to another embodiment of the invention. In FIG. 3, since the piezoelectric vibrator 1 shown in FIG. 1 is used, the explanation thereof will be omitted.

In FIG. 3, a vibrating gyroscope 10 includes a piezoelectric vibrator 1, resistors 11 and 12, an adding circuit 13, an AGC amplifier 14, a differential circuit 15, a synchronous detector circuit 16, a smoothing circuit 17, and an amplifier circuit 18. Two split electrodes 3 and 4 of the piezoelectric vibrator 1 are connected to a reference voltage terminal via the resistors 11 and 12. The split electrodes 3 and 4 are also connected to the adding circuit 13. The output of the adding circuit 13 is connected to a common electrode 6 of the piezoelectric vibrator 1 via the AGC amplifier 14. In addition, the split electrodes 3 and 4 are also connected to the differential circuit 15. The output of the differential circuit 15 is connected to an output terminal via the synchronous detector circuit 16, the smoothing circuit 17, and the amplifier circuit 18, sequentially. The output of the adding circuit 13 is also input to the synchronous detector circuit 16.

In the vibrating gyroscope 10 having the above structure, signals output from the split electrodes 3 and 4 are added by the adding circuit 13 and amplified by the AGC amplifier 14 to be input to the common electrode 6. Then, the piezoelectric vibrator 1 is driven to perform a longitudinal vibration as a bending vibration in the thickness direction. Consequently, the adding circuit 13 and the AGC amplifier 14 constitute a driving unit 19 for vibrating the piezoelectric vibrator 1. Since the resistors R11 and R12 are used for detecting signals, these resistors can also be included in the driving unit.

Since the split electrodes 3 and 4 are substantially symmetrical, in the state in which an angular velocity is not applied, the signals output from the split electrodes 3 and 4 are equal. A phase-shift circuit for adjusting a phase when needed may be inserted into a driving loop composed of the piezoelectric vibrator 1, the adding circuit 13, and the AGC amplifier 14.

When an angular velocity whose rotational axis is the longitudinal direction is applied to the piezoelectric vibrator 1, a transverse vibration as a bending vibration in the widthwise direction is excited in the piezoelectric vibrator 1 by Coriolis force. When the piezoelectric vibrator 1 transversely vibrates, a difference is generated between the signals output from the split electrodes 3 and 4 in such a manner that when one of them becomes larger, the other one becomes smaller according to the magnitude of Coriolis force.

Even though the difference is generated between the signals output from the split electrodes 3 and 4, the changes occur in the mutually opposite directions. Thus, the difference is cancelled in the signals added in the adding circuit 13, and this is the same as the state in which an angular velocity is not applied. On the other hand, the signals output from the split electrodes 3 and 4 are also input to the differential circuit 15. The differential circuit 15 outputs the difference between the two signals, that is, a signal obtained according to Coriolis force. The synchronous detector circuit 16 synchronously detects the signal output from the differential circuit 15 with a signal output from the adding circuit 13. Then, the signal is smoothed by the smoothing circuit 17 and amplified by the amplifier circuit 18 to be output. Thus, the differential circuit 15, the synchronous detector circuit 16, the smoothing circuit 17, and the amplifier circuit 18 constitute a detecting unit 20 for detecting a transverse vibration of the piezoelectric vibrator 1. Since the resistors R11 and R12 are used for detecting signals, these resistors can also be included in the detecting unit.

The vibrating gyroscope 10 incorporates the piezoelectric vibrator 1 whose characteristics do not change significantly even when depole occurs due to heat shock or the like. Thus, the vibrating gyroscope 10 has the excellent property in which there is no significant change in the characteristics due to a change in environment.

Figure 4:
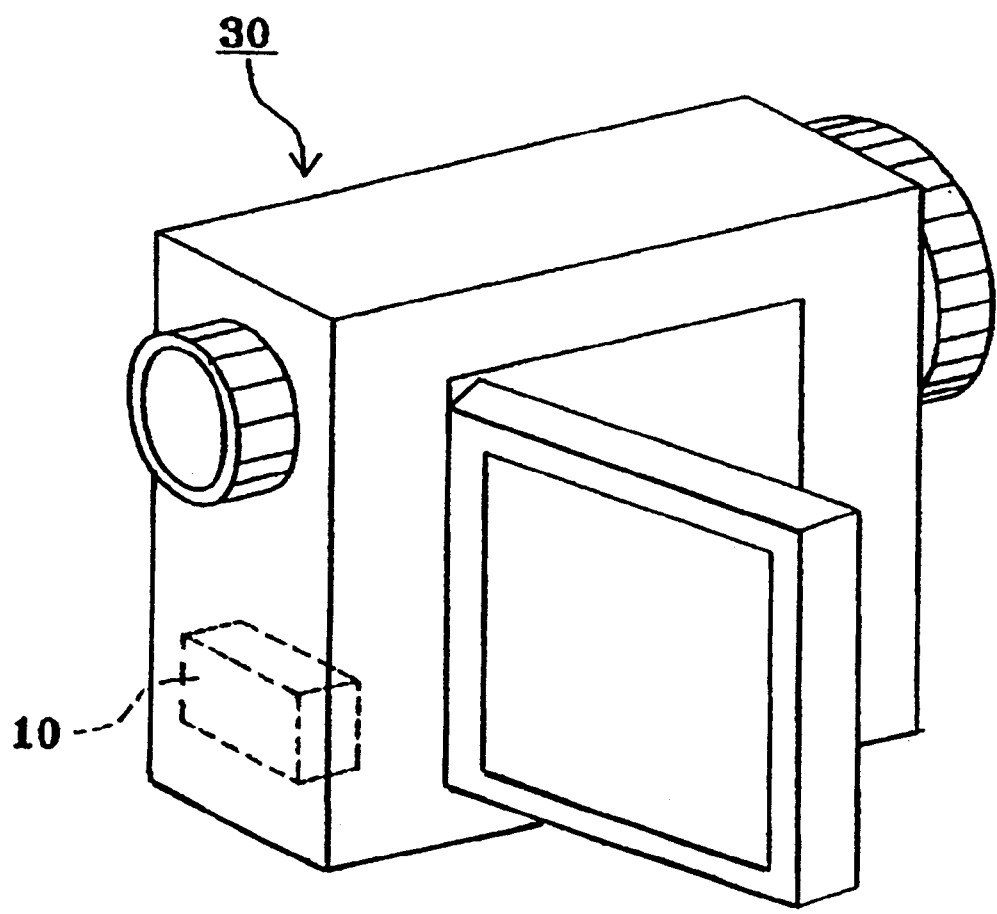
FIG. 4 is a perspective view of an electronic apparatus according to another embodiment of the present invention.

FIG. 4 shows a perspective view of a video camera as an electronic apparatus according to another embodiment of the present invention. In FIG. 4, a video camera 30 includes the vibrating gyroscope 10 of the invention for shake-correction.

In the video camera having the above structure, the vibrating gyroscope 10 enables shake-correction and the characteristics of the gyroscope 10 do not change significantly due to a change in environment. As a result, the performance capabilities of the video camera are not significantly deteriorated due to the change in environment.

The electronic apparatus of the present invention is not restricted to a video camera and includes any kinds of electronic apparatuses using vibrating gyroscopes, such as a digital camera similarly using a vibrating gyroscope for shake-correction and a navigation system used for detecting positions.

As described above, the piezoelectric vibrator of the present invention includes the first piezoelectric substrate polarized in the thickness direction, split electrodes formed on one main surface thereof, the second piezoelectric substrate polarized in the thickness direction, and a common electrode formed on one main surface thereof. The remaining main surfaces of the first and second piezoelectric substrates are bonded to each other. The material of the first piezoelectric substrate differs from the material of the second piezoelectric substrate. Particularly, the former material is set as a first material and the latter material is set as a second material. The first and second materials are chosen in such a manner that the average of the difference between the resonant frequency and the anti-resonant frequency obtained in the longitudinal vibration of the piezoelectric vibrator when the first and second piezoelectric substrates are made of only the first material and the difference between the resonant frequency and the anti-resonant frequency obtained in the longitudinal vibration when they are made of only the second material, substantially coincides with the difference between the resonant frequency and the anti-resonant frequency in the transverse vibration of the piezoelectric vibrator when the first and second piezoelectric substrates are made of the first material. As a result, even when depole occurs due to heat shock or the like, there are little changes in the characteristics of the piezoelectric vibrator.

While preferred embodiments of the present invention have been described above, it is to be understood that variations thereto will occur to those skilled in the art within the scope of the present invention. The scope of the invention is therefore to be determined solely by the appended claims.

What is claimed is:

1. A piezoelectric vibrator comprising:
   a first piezoelectric substrate polarized in the thickness direction;
   split electrodes formed on one of the main surfaces of the first piezoelectric substrate;
   a second piezoelectric substrate polarized in the thickness direction; and
   a common electrode formed on one of the main surfaces of the second piezoelectric substrate;
   wherein the remaining main surface of the first piezoelectric substrate is bonded to the remaining main surface of the second piezoelectric substrate and the material of the first piezoelectric substrate is different from the material of the second piezoelectric substrate.

2. The piezoelectric vibrator according to claim 1,
   wherein the material of the first piezoelectric substrate is set as a first material and the material of the second piezoelectric substrate is set as a second material, and the first and second materials are chosen such that a first difference between a resonant frequency and an anti-resonant frequency obtained in a longitudinal vibration of the piezoelectric vibrator in which the first and second piezoelectric substrates are made of only the first material is greater than a second difference between a resonant frequency and an anti-resonant frequency obtained in a longitudinal vibration of the piezoelectric vibrator in which the first and second piezoelectric substrates are made of only the second material.

3. The piezoelectric vibrator according to claim 2,
   wherein the first and second materials are chosen such that the average value of the first and second differences substantially coincides with the value of the difference between a resonant frequency and an anti-resonant frequency obtained in a transverse vibration of the piezoelectric vibrator in which the first and second piezoelectric substrates are made of the first material.

4. A vibrating gyroscope comprising the piezoelectric vibrator according to one of claims 1 to 3, driving unit for longitudinally vibrating the piezoelectric vibrator, and detecting unit for detecting the transverse vibration of the piezoelectric vibrator.

5. An electronic apparatus comprising the vibrating gyroscope according to claim 4.

* * * * *